United States Patent
Bugnon et al.

(12)
(10) Patent No.: US 6,288,142 B1
(45) Date of Patent: Sep. 11, 2001

(54) PROCESS FOR WARP-FREE PIGMENTING OF POLYOLEFINS

(75) Inventors: Philippe Bugnon, Essert; Fritz Herren, Düdingen, both of (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 36 days.

(21) Appl. No.: 09/687,898

(22) Filed: Oct. 13, 2000

Related U.S. Application Data

(62) Division of application No. 08/359,710, filed on Dec. 20, 1994, now Pat. No. 6,180,694, which is a continuation of application No. 08/121,086, filed on Sep. 14, 1993, which is a continuation of application No. 07/931,751, filed on Aug. 18, 1992, which is a continuation of application No. 07/726,055, filed on Jul. 5, 1991, now Pat. No. 5,274,010.

(30) Foreign Application Priority Data

Jul. 11, 1990 (CH) .................................................. 2313/90
Sep. 14, 1990 (CH) .................................................. 2990/90

(51) Int. Cl.$^7$ ............................. B32B 27/30; C08K 5/34; C08L 33/02
(52) U.S. Cl. ......................... 523/206; 523/205; 428/407; 524/87; 524/88
(58) Field of Search ............................. 428/407; 523/205, 523/206; 524/87, 88

(56) References Cited

U.S. PATENT DOCUMENTS

| | | |
|---|---|---|
| 3,085,989 | 4/1963 | Jordan . |
| 3,806,464 | 4/1974 | Matrick et al. . |
| 3,904,562 | 9/1975 | Hopfenberg et al. . |
| 3,956,230 | 5/1976 | Gaylord . |
| 4,049,615 | 9/1977 | Elsener et al. . |
| 4,107,133 | 8/1978 | Sawai et al. . |
| 4,233,206 | 11/1980 | Katsura et al. . |
| 4,488,435 | 12/1984 | Kastl et al. ........................... 524/548 |
| 4,771,086 | 9/1988 | Martin . |
| 4,808,230 | 2/1989 | Bugnon et al. . |
| 4,889,562 | 12/1989 | Bugnon et al. . |
| 4,957,949 | 9/1990 | Kamada et al. . |
| 4,983,661 | 1/1991 | Ali et al. . |
| 5,037,475 | 8/1991 | Chida et al. . |

FOREIGN PATENT DOCUMENTS

| | | |
|---|---|---|
| 3 327 562 | 2/1985 | (DE) . |
| 3 613 257 | 10/1987 | (DE) . |
| 1 408 842 | 10/1975 | (GB) . |

OTHER PUBLICATIONS

Chem. Abst. 90(14):104966u, 1978.
Chem. Abst. 91(6):40351a, 1979.
Chem. Abst. 90(16):122564r, 1978.
Chem. Abst. 97:164038x 5/1982.
Chem. Abst. 98:(16)127145e 10/1982.
Chem. Abst. 99:89115f 2/1983.
Chem. Abst. 97(10):73414a 3/1982.
Chem. Abst. 98:127131x 9/1982.
Derw. Abst. 87–299965/43 4/1986.
Derwent Abst. 85–038989/07 2/1985.
Herbst et al. Industrielle Organische Pigments pp. 76–77, 1987.
Fluka Catalog pp. 1154 & 18, 1988.
Grant & Hackh's Chem. Dictionary 5$^{th}$ Edition pp. 374 & 375, 1987.

*Primary Examiner*—Kriellion Sanders
(74) *Attorney, Agent, or Firm*—David R. Crichton

(57) ABSTRACT

A process for the warp-free pigmenting of polyolefins, wherein an organic pigment is used whose particles are coated on the surface by one or more films of polar polymers.

4 Claims, No Drawings

PROCESS FOR WARP-FREE PIGMENTING OF POLYOLEFINS

This is a divisional of application Ser. No. 08/359,710 filed Dec. 20, 1994, now U.S. Pat. No. 6,180,694, which is a Continuation of application Ser. No. 08/121,086 filed on Sep. 14, 1993, now abandoned which is a Continuation of application Ser. No. 07/931,751 filed on Aug. 18, 1992 now abandoned which is Continuation of application Ser. No. 07/726,055 filed Jul. 5, 1991, now U.S. Pat. No. 5,274,010.

The present invention relates to a process for the warp-free pigmenting of polyolefins using organic pigments coated by polar polymers.

In the colouring of polyolefins, in particular polyethylene, using organic pigments, it is frequently observed that a number of mechanical properties of the coloured material changes with time; defects occur which are collectively known as warping phenomena. In large-volume injection-moulded parts, such as bottle crates, made from high density polyethylene, for example, deformation and shrinkage can be observed, sometimes resulting in cracking and usually rendering the articles unusable. Frequently, embrittlement of the material also sets in after a relatively short service life. These disadvantages relate to the majority of organic pigments, while inorganic pigments and a minority of organic pigments have a neutral behaviour. It is assumed that these disadvantages arise because the typical crystallisation behaviour of the polyolefins is disturbed by the presence of the pigments, since the latter can act as centres of nucleation.

Various methods have already been proposed for overcoming these disadvantages. These mostly relate to certain classes of pigments. For example, warp-free colouring of polyolefins is achieved, according to U.S. Pat. No. 4,233,206, by using organic pigments containing methylol groups which have been esterified by carboxylic acids (in particular copper phthalocyanines); according to JP Kokai 53/124 555, U.S. Pat. No. 4,107,133 and JP Kokai 53/143 646 by using an isoindolinone or copper phthalocyanine pigment which has been treated with a silane coupler; according to JP Kokai 53/132 048 by using an isoindolinone pigment with addition of a salicyloyl hydrazide; according to JP Kokai 57/73 029 by using a quinacridone, isoindolinone, azo or phthalocyanine pigment which is adsorbed onto inorganic material (for example silica gel) and then treated with a silane or titanium coupler, according to JP Kokai 57/159 831 by using an isoindolinone pigment which has been treated with a phenylenebistetrachlorobenzamide; and according to JP Kokai 58/23 840 by using a phthalocyanine pigment with addition of a halomethylcopper phthalocyanine which has been treated with an amine.

According to JP Kokai 57/51 733 and 57/155 242, the warp properties of isoindolinone pigments can also be improved by recrystallising the pigment. However, as is generally known amongst those skilled in the art, the increase in mean particle size which this produces is at the cost of other important pigment properties, in particular the colour strength.

U.S. Pat. No. 4,049,615 describes a process for the warp-free colouring of polyolefins using an organic pigment, in particular a perylene, perinone, bisazo or isoindolinone pigment, coated with a melamine-formaldehyde resin.

These methods do not always meet the high demands of modern industry and, depending on the pigment, do not always give the desired result. Thus, for example, no method is known which would allow diketopyrrolopyrrole pigments to be used for the warp-free pigmenting of polyolefins.

The coating of pigments with polar polymers is known per se. Thus, for example, U.S. Pat. No. 3,806,464 discloses pigments for example copper phthalocyanine, quinacridone, azo, thioindigo and flavanthrone pigments, whose particles are coated with a certain acrylic polymer composition which pigments, for compatibility reasons, are particularly suitable for colouring the acrylic finishes which are increasingly employed today in the automotive industry.

DE-A-2 200 322 discloses polyvinyl alcohol pigment compositions which are suitable, for example, as aquarelle colours.

U.S. Pat. No. 3,904,562 describes polyvinylpyrrolidone pigment compositions which have advantages in coating compositions with respect to heat resistance, bleeding and gloss.

Although the coating of pigments with polar polymers has already been disclosed, the effect of such pigments on the warping properties on colouring of polyolefins has hitherto not been recognised.

It has been found that virtually all organic pigments and in particular diketopyrrolopyrrole pigments are surprisingly suitable for the warp-free pigmenting of polyolefins if they are coated directly or indirectly with a film of a polar polymer.

The invention accordingly relates to a process for the warp-free pigmenting of polyolefins wherein an organic pigment is used whose particles are coated on the surface with one or more films of polar polymers.

Polar polymers which are suitable for the coating are selected, for example, from the group comprising linear or branched homopolymers or copolymers from the classes comprising the acrylic polymers based on acrylic acid, methacrylic acid and/or alkyl esters thereof,
polyvinyl alcohols,
polyvinylpyrrolidones,
cellulose derivatives and
maleic anhydride-styrene copolymers.

The abovementioned polymers are employed, for example, in an amount of from 0.5 to 20% by weight, preferably from 1 to 10% by weight, based on the pigment.

The abovementioned acrylic polymers can, if desired, be modified by generally conventional methods by incorporating derivatives of the acids, for example amides, or by using further comonomers, such as styrene, acrylonitrile, vinyl acetate, vinylphosphonates, vinyl propionate, vinyl chloride, itaconic acid, maleic acid and derivatives thereof or other α,β-unsaturated compounds (cf., for example, Ullmanns Encyclopädie der technischen Chemie [Ullmann's Encyclopaedia of Industrial Chemistry], Volume 19, pp. 1 ff., in particular p. 7, 4th Edition).

Suitable alkyl esters of acrylic and methacrylic acids to be employed according to the invention are expediently the methyl, ethyl, n-propyl, isopropyl, hydroxymethyl and hydroxyethyl esters, it also being possible, in addition, for smaller amounts of long-chain alkyl esters to be present (long-chain alkyl is, for example, branched or unbranched octyl, nonyl, decyl, dodecyl, hexadecyl or octadecyl). Methyl esters are preferred.

Of the polyvinyl alcohols which are of particular interest as the coating, the generally known polyvinyl alcohols, unmodified or modified by esters, ethers or acetal groups, and polyvinyl alcohol-containing copolymers, for example block copolymers with polyvinyl alcohol segments, are suitable. Preferred polyvinyl alcohols are those having a degree of hydrolysis of greater than 80%, in particular between 85 and 99.8%, and a degree of polymerisation of from 200 to 2500, in particular from 250 to 1800 (MW about 10,000–100,000).

The polyvinylpyrrolidones may also be modified by using copolymers such as styrene, acrylonitrile, vinyl propionate, vinyl chloride and, in particular, vinyl acetate. Preferred polyvinylpyrrolidones are those having a molecular weight between 5000 and 500,000.

Preferred copolymers based on maleic anhydride/styrene are those having a maleic anhydride:styrene ratio of from 1:1 to 1:3.

Preferred cellulose derivatives are sodium carboxymethylcellulose, cellulose acetobutyrate, cellulose acetopropionate, ethylhydroxyethylcellulose and, in particular, hydroxyethylcellulose.

The coating of the pigment can in principle be carried out by two generally known methods: by adsorption of a preformed, soluble polymer or oligomer onto the pigment or by polymerisation of corresponding monomers in the presence of the pigment. The latter method can be employed, in particular, when acrylic polymers are used.

In the former case, the pigment to be treated is post-treated in aqueous suspension with the polar polymer with stirring. The starting material may be the dry pigment powder, a press cake or a suspension as obtained from the synthesis. The polymer may either be predissolved in water or added in solid form to the pigment suspension. If necessary, the suspension can be dispersed by conventional methods using a dispersion unit (for example a high-pressure homogeniser or a high-speed stirrer). This is usually not necessary since the polar polymers generally have very good wetting properties. The pigment content in the suspension can be varied within broad limits and may be up to 40% by weight. Suspensions containing from 5 to 20% by weight of pigment are expediently employed. The post-treatment of the pigment with the polar polymer can be carried out at room temperature, but if desired also up to an elevated temperature of about 80° C. The stirring time varies between 5 minutes and 20 hours. In order to simplify filtration of the treated pigment, filtration aids, for example from 0.5 to 15% by weight of an aliphatic 1,2-dihydroxyl compound having 8 to 22 carbon atoms, in particular from 1 to 5% by weight of 1,2-dodecanediol, can be employed so long as they have no adverse effect on the use of the pigments according to the invention (in particular in polyethylene). Analogous additives (for example customary dispersants) can also be added in conventional amounts to improve the dispersibility of the product. The polymer may also be precipitated onto the pigment by adding a precipitant (for example NaCl or $Na_2SO_4$) or the pigment and polymer are ground together, for example in a ball or sand mill, in the presence of a sufficient amount of solvent to at least partially dissolve the polymer. It may also be expedient to crosslink the polymer by conventional methods. Examples of crosslinking agents which can be used here are boron-containing compounds (for example boric acid or sodium borate), metal compounds (for example zirconium propylate, aluminium salts), and bifunctional reactants (for example dicarboxylic acids and dicarboxylic acid chlorides).

In general, the coating methods are known and described, for example, in U.S. Pat. Nos. 3,532,662, 3,806,464, 3,876,603 and 3,904,562.

In the latter case, ie. polymerisation of monomers in the presence of a pigment, untreated pigment can be employed in accordance with known methods, as described, for example, in U.S. Pat. Nos. 3,133,893 and 3,897,586, or pretreated pigment can be employed to improve the adsorption of the polymer. Various pretreatment methods of this type are customary and well known amongst those skilled in the art. Some of these methods are described, for example, in U.S. Pat. Nos. 3,544,500, 3,891,572, 4,608,401, 4,680,200 and 4,771,086. In analogy to a method described in U.S. Pat. No. 3,884,871, copolymerisable monomers (for example vinyl monomers containing polar groups, for example —COOH, —$SO_3H$, —$NH_2$, —OH, —$CONH_2$ etc) can also be adsorbed onto the pigment by pretreatment.

Preferred polar polymers for the process according to the invention are polyvinylpyrrolidones, cellulose derivatives, preferably hydroxyethylcellulose, and, in particular, polyvinyl alcohols. The coating is preferably in one layer. Combinations of polar polymers can also be employed according to the invention. Thus, for example, a further and novel pigment coating which is advantageous for the warp-free colouring of polyolefins and which likewise forms the subject-matter of this invention comprises applying an acrylic polymer film on top of a polyvinyl alcohol film adsorbed onto the surface of the pigment particles. The preparation is carried out, for example, by adsorption of polyvinyl alcohol onto the pigment in an aqueous pigment dispersion with stirring for from 5 minutes to 4 hours at room temperature and subsequent free-radical-initiated emulsion polymerisation of the acrylic monomers and, if used, the comonomers in the presence of the pretreated pigment, again with stirring, for from 1 to 4 hours, but at temperatures between 60 and 100° C., preferably between 70 and 90° C., analogously to the abovementioned processes. The acrylic polymer is preferably employed here in amounts of from 1 to 5% by weight, and the polyvinyl alcohol in amounts of from 0.5 to 8%, based on the pigment.

Another novel pigment coating which is preferred for the warp-free colouring of polyolefins and represents a further subject-matter of the invention comprises applying the abovementioned acrylic polymer film on top of a silane film which essentially comprises a hydrolysed silane of the formula

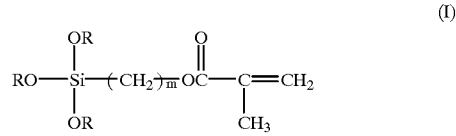

(I)

in which R is methyl or ethyl and m is a number from 1 to 6, which has itself been adsorbed onto a film of hydrolysed zirconium acetylacetonate which coats the surface of the pigment particles.

The preparation is carried out, for example, as follows:
adsorption of zirconium acetylacetonate onto the pigment dispersed in water or a lower alkyl alcohol (for example methyl, ethyl, n-propyl, isopropyl, n-butyl, sec-butyl, tert-butyl or amyl alcohol) with stirring, generally for at least one hour at temperatures between 20 and 50° C., and subsequent hydrolysis by increasing the pH to 8–9 by adding a base, for example sodium hydroxide solution, potassium hydroxide solution or ammonia, analogously to the method described in U.S. Pat. No. 4,880,472;
application of the silane, possibly dissolved in a lower alkyl alcohol (for example as described above) with stirring for from 1 to 4 hours at from 50 to 100° C., preferably 60 to 80° C.; and
polymerisation of the acrylic monomers and, if used, the comonomers in the presence of the thus-pretreated pigment by the process described above.

The zirconium acetylacetonate is employed in amounts of from 1 to 5% by weight, preferably from 2 to 3% by weight, calculated as the oxide, and the silane is employed in amounts of from 1 to 10% by weight, preferably from 2 to 5% by weight, in each case based on the pigment.

Preference is given to the silane of the formula

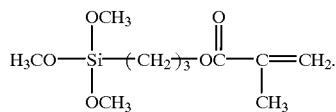

In the abovementioned methods, the polymerisation of the unsaturated monomers is carried out by various conventional methods, for example in aqueous emulsion using persulfate as initiator. It is of course also possible to use other polymerisation processes (for example in solvents) and other widely used initiators, it being possible for the polymerisation to be initiated thermally or photochemically (cf., for example, Comprehensive Polymer Science (Pergamon Press), Vol. 3+4, or Ullmann, Vol. 19, pages 1–15).

Examples of pigments which are particularly suitable for the process according to the invention are those from the azo, diketopyrrolopyrrole, perylene, quinacridone, phthalocyanine, perinone, quinophthalone, isoindolinone, isoindoline, benzimidazolone, dioxazine, anthraquinone, thioindigo, methine, azomethine and metal complex series.

However, particularly important pigments are those from the azo, diketopyrrolopyrrole, perylene, quinacridone, phthalocyanine, isoindoline and isoindolinone series, preferably the diketopyrrolopyrroles and in particular 1,4-diketo-3,6-di(4-chlorophenyl)pyrrolo[3,4-c] pyrrole.

The great and surprising advantage of the process according to the invention is that polyolefins, in particular high density polyethylenes, can be coloured using high-fastness organic pigments which were hitherto unsuitable or at least less suitable for this purpose.

The effect on warping of polyolefins by a pigment is tested on an injection moulding in the form of a plate. After ageing for 72 hours at 100° C., the dimensions of the plate (length and width) are measured and the warp ΔL (length) and ΔW (width) are determined in °/oo in accordance with the following equations:

$$\Delta L = \frac{L \text{ of uncoloured test specimen} - L \text{ of pigmented test specimen}}{L \text{ of uncoloured test specimen}} \times 1000$$

$$\Delta W = \frac{W \text{ of uncoloured test specimen} - W \text{ of pigmented test specimen}}{W \text{ of uncoloured test specimen}} \times 1000$$

Pigments which have proven to be warp-free in practice are those in which the absolute values of ΔL and ΔW are less than 5; values less than 3 are particularly preferred.

The examples below illustrate the invention.

EXAMPLE 1

28 g of a 36% aqueous press cake of 1,4 diketo-3,6-di(4-chlorophenyl)pyrrolo[3,4-c]pyrrole are dispersed in 100 ml of water at room temperature for 45 minutes by vigorous stirring. 1 g of polyvinyl alcohol ®PVA 15000 (FLUKA AG), degree of polymerisation 300, degree of hydrolysis 86–89%, is subsequently added. The suspension is stirred at room temperature for 18 hours and subsequently filtered, and the product is dried at 80° C. and powdered.

EXAMPLE 2

The procedure is as in Example 1, but the PVA 15000 is replaced by 1 g of polyvinyl alcohol ®PVA 72000 (FLUKA AG), degree of polymerisation 1600, degree of hydrolysis 97.5–99.5%.

EXAMPLE 3

35.5 g of a 42.2% aqueous press cake of β-copper phthalocyanine pigment CI Pigment Blue 15:3 are dispersed in 113 ml of water by stirring overnight using a toothed disc mill in the presence of 1.5 g of polyvinyl alcohol ®PVA 15000 (FLUKA AG). The product obtained is subsequently filtered, washed successively with water and acetone and dried in a vacuum drying oven.

EXAMPLE 4

15 g of the azo pigment CI Pigment Red 166 are dispersed in 134 ml of water and 0.75 g of polyvinyl alcohol ®PVA 15000 (FLUKA AG) using a toothed disc mill, and the mixture is subsequently stirred for a further 17 hours. The product obtained is filtered, washed with water and dried in a vacuum drying oven at 80° C.

EXAMPLE 5

15 g of isoindolinone pigment CI Pigment Yellow 110 are dispersed in 133 ml of water using a toothed disc mill. 1.5 g of polyvinyl alcohol ®PVA 15000 (FLUKA AG) as a powder are then added with stirring. The suspension is stirred overnight. The product obtained is subsequently filtered, washed successively with water and acetone and dried in a vacuum drying oven.

EXAMPLE 6

5 g of the α-quinacridone pigment CI Pigment Violet 19 are dispersed for one hour by vigorous stirring (®Ultraturrax) with 45 ml of water and 0.25 g of polyvinyl alcohol ®PVA 15000 (FLUKA AG). 50 ml of a 1M Na$_2$SO$_4$ solution are subsequently added over the course of 30 minutes. The suspension is then filtered, and the residue is washed with water, dried at 80° C. and screened.

EXAMPLE 7

5 g of the quinacridone pigment CI Pigment Red 202 are dispersed for one hour by vigorous stirring (®Ultraturrax) in 45 ml of water with 0.25 g of polyvinyl alcohol ®PVA 15000 (FLUKA AG).The suspension is warmed to 80° C., and 0.105 g of boric acid dissolved in 10 ml of water are then slowly added dropwise, and the pH is subsequently increased to 8.5 using 1N NaOH. The mixture is stirred for 2 hours and filtered, and the residue is washed with water, dried at 80° C. and screened.

EXAMPLE 8

800 g of a 39.4% aqueous press cake of 1,4-diketo-3,6-di(4-chlorophenyl)-pyrrolo[3,4-c]pyrrole and 15.75 g of polyvinylpyrrolidone (K15, FLUKA AG) are dispersed in 2665 ml of water by vigorous stirring (®Ultraturrax) at room temperature for 20 minutes. The suspension is stirred at room temperature for 16 hours and subsequently filtered, and the residue is dried at 80° C. and powdered.

EXAMPLE 9

The procedure is as described in Example 8, but the 800 g of diketopyrrolopyrrole pigment press cake are replaced by 315 g of the isoindolinone pigment CI Pigment Yellow 110 in powder form.

EXAMPLE 10

20 g of the β-copper phthalocyanine pigment CI Pigment Blue 15:3 and 1 g of polyvinylpyrrolidone (K15, FLUKA AG) are dispersed in 200 ml of water and 20 ml of ethanol by vigorous stirring (®Ultraturrax) at room temperature for 20 minutes. The suspension is stirred at room temperature for 16 hours and subsequently filtered, and the residue is dried at 80° C. and powdered.

EXAMPLE 11

80.2 g of a 37.4% aqueous press cake of 1,4-diketo-3,6-di(4-chlorophenyl)-pyrrolo[3,4-c]pyrrole are dispersed in 250 ml of water with 1.5 g of polyvinylpyrrolidone-vinyl acetate copolymer ®PVP/VA 1735 (GAF) by vigorous stirring (®Ultraturrax) at room temperature for one hour. The suspension is stirred at room temperature for 18 hours and subsequently filtered, the residue is dried at 80° C. and powdered.

EXAMPLE 12

38 g of a 39.4% aqueous press cake of 1,4-diketo-3,6-di(4-chlorophenyl)-pyrrolo[3,4-c]pyrrole and 0.75 g of hydroxycellulose (medium viscosity 1, FLUKA AG) are dispersed in 91 ml of water by vigorous stirring (®Ultraturrax) at room temperature, and the mixture is stirred for 19 hours. The suspension is subsequently filtered, and the residue is washed with water and dried at 80° C. in a vacuum drying oven.

EXAMPLE 13

76 g of a 39.4% aqueous press cake of 1,4-diketo-3,6-di(4-chlorophenyl)-pyrrolo[3,4-c]pyrrole and 1.5 g of sodium carboxymethylcellulose (low viscosity, FLUKA AG) are dispersed in 222 ml of water by vigorous stirring (®Ultraturrax) for 2½ hours. The suspension is subsequently stirred for 20 hours and then filtered, and the residue is washed with water, dried at 80° C. in a vacuum drying oven and screened.

EXAMPLE 14

25.4 g of a 39.4% aqueous press cake of 1,4-diketo-3,6-di(4-chlorophenyl)-pyrrolo[3,4-c]pyrrole are dispersed in 65 ml of water and 10 g of a 4% ammoniacal solution of styrene-maleic anhydride copolymer (SMA 1440, Atochem) by vigorous stirring at room temperature for 2 hours. The pH is then adjusted to 6 using 0.1N HCl. The suspension is then stirred for a further two hours and subsequently filtered, the residue is washed with water, dried at 80° C. and powdered.

EXAMPLE 15

40.1 g of a 37.4% aqueous press cake of 1,4-diketo-3,6-di(4-chlorophenyl)-pyrrolo[3,4-c]pyrrole and 15 g of a 5% aqueous-ethanolic solution of methyl methacrylate-methacrylic acid copolymer are dispersed in 95 ml of water by vigorous stirring at room temperature, the mixture is then stirred for 19 hours. The suspension is then filtered, and the residue is dried at 80° C. and screened.

EXAMPLE 16

The procedure is as described in Example 15, but the methyl methacrylate-methacrylic acid copolymer is replaced by the same amount of styrene-acrylic acid copolymer.

EXAMPLE 17

28 g of a 36% aqueous press cake of 1,4-diketo-3,6-di(4-chlorophenyl)-pyrrolo[3,4-c]pyrrole are stirred for 2 hours at room temperature in 70 ml of water containing 0.5 g of polyvinyl alcohol ®PVA 15000 (FLUKA AG). 30 ml of a 0.67% emulsion of methyl methacrylate, 30 ml of a 0.83% aqueous solution of methacrylic acid and 25 ml of a 1.25% aqueous solution of potassium persulfate are subsequently added under nitrogen, with the mixture being stirred for 8 minutes after each addition. The suspension is heated to 80° C. and stirred at this temperature for 3 hours. The mixture is subsequently cooled and filtered, and the residue is washed with water and dried at 80° C. in a vacuum drying oven.

EXAMPLE 18

28 g of a 36% aqueous press cake of 1,4-diketo-3,6-di(4-chlorophenyl)-pyrrolo[3,4-c]pyrrole are suspended in 100 ml of water containing 0.8 g of zirconium acetylacetonate, and the mixture is stirred for 2 hours. The mixture is subsequently heated to 75° C. and the pH is adjusted to 8.5 by adding 2.4 g of 1N sodium hydroxide solution. The suspension is then stirred at 70° C. for a further 8 hours and subsequently cooled. The pH is now 7.0. 0.25 g of methacryloxypropyltrimethoxysilane, dissolved in 10 ml of isopropanol are added, and the suspension is heated to 75° C. and stirred for 3 hours. 10 ml of an aqueous 4% emulsion of methyl methacrylate, 10 ml of a 5% aqueous solution of methacrylic acid and finally 10 ml of an aqueous 0.5% potassium persulfate solution are subsequently added under nitrogen. The mixture is stirred at 70° C. for 5 hours, cooled and filtered, and the residue is washed and dried at 80° C. in a vacuum drying oven.

EXAMPLE 19

2 g of the coated pigment obtained as described in Example 1 are mixed with 1 kg of polyethylene ®Stamilan 9089V in a tumble mixer for 10 minutes in dry form. The mixture is subsequently extruded twice at 200° C. in a single-screw extruder. The granules obtained in this way are converted into plates measuring 174×49×2.5 mm at 240° C. in an injection-moulding machine. After ageing for 72 hours at 100° C. the dimensions of the pigmented plate according to the invention and of a pigmented plate produced under identical conditions, but containing the same amount of uncoated pigment, are measured, and the warp effect is determined by the method described above.

Compared with the plate coloured using uncoated pigment, the plate produced by the process according to the invention gives greatly reduced $\Delta L$ and $\Delta W$ values.

If the above procedure is repeated, but using the same amount of one of the pigments obtained as described in Examples 2 to 18, a plate is obtained with analogously good $\Delta L$ and $\Delta W$ values.

What is claimed is:

1. A process for warp-free pigmenting of polyolefins, which comprises:
   (a) coating organic pigment particles belonging to the phthalocyanine, quinacridone, isoindoline or isoindolinone series with one or more films of a preformed polymer adsorption of from 1 to 5% by weight of the polymer, based on the pigment, onto the surface of the pigment particles at room temperature, the polymer being selected from the group consisting of polyvinylpyrrolidone homopolymers and copolymers; and
   (b) admixing the coated pigment particles with a polyolefin.

2. A process according to claim 1 wherein the pigment is Pigment Blue 15:3.

3. A process for warp-free pigmenting of polyolefins, which comprises:

(a) coating organic pigment particles belonging to the phthalocyanine, quinacridone, isoindoline or isoindolinone series with one or more films of a preformed polymer by adsorption of from 1 to 10% by weight of the polymer, based on the pigment, onto the surface of the pigment particles at room temperature, the polymer being a polyvinylpyrrolidone-vinyl acetate copolymer; and (b) admixing the coated pigment particles with a polyolefin.

4. A process according to claim 3 wherein the pigment is Pigment Blue 15:3.

* * * * *